E. F. BURROW.
GREASE CUP.
APPLICATION FILED JAN. 18, 1915.
1,148,473.
Patented July 27, 1915.
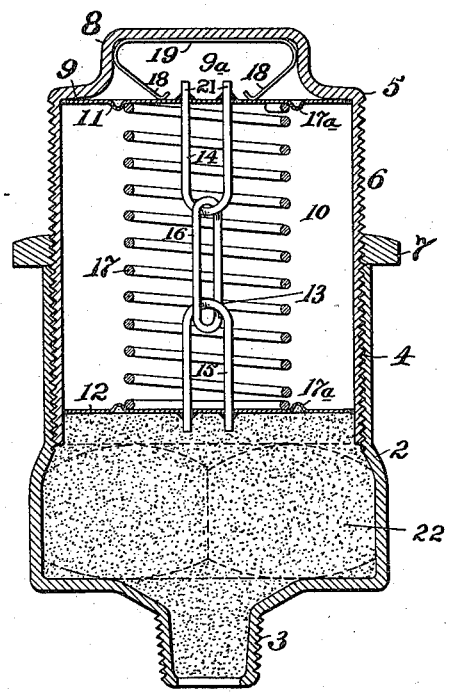
FIG. 1.
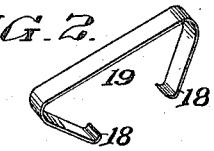
FIG. 2.
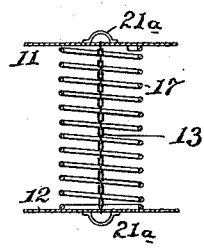
FIG. 3.
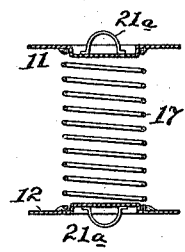
FIG. 4.
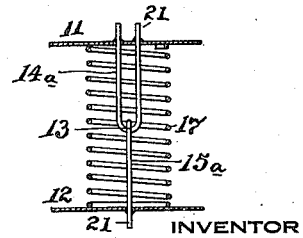
FIG. 5.
WITNESSES
INVENTOR
Edward F. Burrow
BY
ATTORNEY

UNITED STATES PATENT OFFICE.

EDWARD F. BURROW, OF PHILADELPHIA, PENNSYLVANIA, ASSIGNOR TO RUDOLPH M. HUNTER, OF PHILADELPHIA, PENNSYLVANIA.

GREASE-CUP.

1,148,473.  Specification of Letters Patent.  Patented July 27, 1915.

Application filed January 18, 1915. Serial No. 2,803.

*To all whom it may concern:*

Be it known that I, EDWARD F. BURROW, a citizen of the United States, and resident of Philadelphia, county of Philadelphia, and State of Pennsylvania, have invented an Improvement in Grease-Cups, of which the following is a specification.

The object of my invention is to provide an inexpensive and effective construction of a grease cup adapted for lubricating machinery, the grease cup to operate in an automatic manner under the action of compressed air and mechanical means such as a spring.

More particularly, my object is to provide a construction of pressure applying means for the grease within the cup, which may be adjusted to provide the desired degree of pressure upon the surface of the grease and utilize that pressure in an automatic manner so that the grease may be positively fed from the grease cup in accordance with the demand; and further in providing capacity for adjusting the grease cup for reëstablishing the requisite pressure conditions to repeat the operation of automatic feeding from time to time as the necessities of adjustment may dictate.

My object is also to provide the internal construction of the grease cup, by which the pressure is applied to the grease, of such a nature that it may be readily removed for cleansing and preferably may be reversible so that it would be immaterial in which direction it may be inserted in the cup so as to prevent any possibility of defective assemblage by an inexperienced workman.

My object is further to provide pressure applying devices of such a nature that when said devices press upon the grease they will automatically level the same and put it under compression with a more or less elastic or yielding pressure, so that the operator in adjusting the cup may be able to determine by the feel of the fingers the extent of the compression and thus determine the proper adjustment when accomplished.

My invention consists of the cup body and cap therefor, adapted to screw into each other, and the latter provided with a pressure applying device comprising a pair of disks approximately fitting the interior of the cap, a spring between the disks for forcing them apart, and connecting means between the disks for limiting the action of the spring and thereby the maximum separation of the disks, the construction being such that under the compression produced by pressure of the grease upon one of the disks, it is forced upward within the cap, simultaneously compressing the spring and also the air which may be confined within the cap above the grease, so that the combined action of the spring and compressed air may be availed of as the motive force for ejecting the grease from the cup, as the same may be permitted by the bearing being lubricated.

My invention also comprehends other features of construction which together with those above enumerated are more particularly described hereinafter and defined in the claims, and will be better understood by reference to the drawings, in which:—

Figure 1 is a sectional elevation of a grease cup embodying my improvements; Fig. 2 is a perspective view of the cap spring; and Figs. 3, 4 and 5 are sectional elevations of modified forms of the pressure applying devices shown in Fig. 1.

2 is the body and is provided at the bottom with a screw threaded nipple through which the grease is fed to the bearing, and by which the cup is held in position. This body part 2 is internally screw threaded as at 4. 5 is a cap and is externally screw threaded at 6 and is screwed into the threaded portion 4 of the body 2. When screwed to the proper position for adjustment, it may be temporarily locked in that position by the lock nut 7 if the cup is subjected to any material jarring. The cap 5 is cylindrical on the inside and is provided at the top with a recess $9^a$ formed within the hexagonal or other polygonal shaped member 8 which provides means for applying a wrench for purposes of adjustment. Between the recessed portion $9^a$ and the outer cylindrical part of the cap I provide an annular shoulder 9. In practice all of the parts so far described are preferably formed of stamped, drawn and hydraulically shaped sheet metal, but I do not restrict myself in regard to the particular manner of making the body and cap as they may be made in any other suitable manner.

The means for applying pressure upon the grease is indicated at 10, and consists essentially of the two disks 11 and 12, connected by a yielding connection 13 to limit the distance to which these disks may be moved apart, and a surrounding helical spring 17, the ends of which press against the two disks 11 and 12 to tend to press them apart. As shown in Fig. 1 the disk 11 is provided with a link section 14 soldered or otherwise secured to it and simultaneously the disk 12 is provided with a link section 15 also soldered or otherwise secured to it. The two link sections 14 and 15 are connected by a link 16 so that the said disks are connected in a flexible manner and yet are limited as to the possible distance they can be moved apart. The spring 17, which surrounds the link connection 13, may be of any suitable strength desired, which may be varied according to the character of the grease to be used, and said springs may merely be centralized by ribbed portions 17a on the disks, or they may be secured in position in any suitable manner. This spring 17 is under constant tension so that if the mechanism 10 be removed from the cap the disks will assume a parallel position at a distance apart limited by the link connection 13, and yet will at all times be flexibly or yieldingly connected. The disks 11 and 12 are approximately the internal diameter of the cap, but so as to freely slide therein and be guided thereby. The ends of the link sections 14 and 15 may extend through the disks as indicated at 21 so as to provide means which may be grasped by the fingers should it be necessary to forcibly withdraw the device 10 from the cap should the grease from any cause hold it therein after the cap has been separated from the body. In Fig. 1 it will be further observed that the diameter of the disks 11 and 12 is approximately that of the largest internal diameter of the cap 5 so that the inner (and usually the upper) disk will be in position to be forced against the annular shoulder 9 at the inner end of the cap, and in the drawing the device is shown in operative position with the pressure upon the grease 22 so that the spring 17 is pressing upon the disk 11 and said disk is resisting the upward movement by its contact with the shoulder 9. In this way the downward adjustment of the cap 5 within the body 2 will provide for any spring pressure desired, and moreover as the grease seals the peripheral space about the lower disk 12 and the inner walls of the cap, the air above the said disk 12 is put under compression. In this manner I have not only the action of the spring 17 but also the compressed air within the upper portion of the cap for providing an elastic or yielding pressure which will constantly act to lower the disk 12 and apply pressure upon the grease to forcibly feed it, under said elastic pressure, to the bearing.

Arranged within the chamber 9a I may provide a delicate leaf or other spring 19 with free ends 18 against which the upper disk 11 is forced when the cup is put under compression, the said spring ends 18 exerting less power than the spring 17 at any time when the latter is under compression. The object of this spring 19 is to force the disk 11 away from the shoulder 9 or in such light contact therewith, when the compressed air has fully expended its force as a feeding means to the grease, that the attendant may by rotating the cap 5 know for a certainty that there is no resistance between the said shoulder 9 and the upper disk 11 of the compression device 10, and thereby be informed by the feel what the relation of the parts within the cup actually is.

The operation of the device will now be understood and may be briefly stated as follows: Assuming the cap 5 to be unscrewed from the body, the latter is substantially filled with grease, the pressure applying device 10 is dropped into the upturned cap 5 and rests upon the spring ends 18. The cap is then inverted and screwed into the body. The lower disk 12 rests upon the grease and as the cap is screwed down upon the body it will also be adjusted relatively to the two disks 11 and 12. The cap at this time will be freely rotatable. As it is depressed, the shoulder 9 will ultimately be brought in contact with the disk 11 and as the adjustment continues the pressure of this shoulder 9 will increase. The grease tends to resist rotation of the disk 12 while the cap tends to induce rotation of the disk 11 as the compression continues. During this compression by the adjustment of the cap the disk 11 is moved down toward the disk 12, with the result that the spring 17 is put under compression and the air above the disk and within the cap 5 is also put under compression. The spring action will now be detected by the turning of the cap as the spring 17 will tend to rotate the cap reversely to its direction of turning in adjustment. Finally a point is reached when the resistance to adjustment indicates to the operator that sufficient compression has been provided. The action thereafter is by the combined elasticity of the spring 17 and the compressed air within the cap 5 in forcing the disk 12 axially through the lower part of the cap and forcing the grease before it. When this action has proceeded to such an extent that the cap may be again turned freely by the release between the disk 11 and the annular shoulder 9, due to the expansion of the spring 17 and also to the action of the spring ends 18, the operator will know that the cup should need further adjustment and the first operation may be repeated. If the expansion of the compressed air and the spring 17 takes place to the limit of the action of the spring restricted by the link connection 13, all friction between the disk 11 and the shoulder 9 will have been removed, and yet at this time the spring 17 would be under pressure so far as positioning the disks 11 and 12 relatively to each other. By the construction above outlined, and its operation as described, it is possible for the operator to accurately adjust the pressure to be applied upon the grease and to know the extent of the relative adjustments of the parts within the cup without being able to see them, as the feel of the resistance as above explained will enable the operator to correctly diagnose the condition within the cup.

While the spring 19 is desirable, it may be omitted if desired, and especially in cups in which the outlet nozzle 3 is at the bottom.

The construction of the internal mechanism 10 may be modified as indicated in either of the several Figs. 3, 4 and 5. In Fig. 3 the connecting means 13 has the middle link 16 omitted and the two link sections 14$^a$ and 15$^a$ interengaging in a loose manner. In Fig. 4 the link connection 13 is indicated as a small chain, and in this case wire loops 21$^a$ are soldered at the outer part of each of the disks by which they may be grasped to withdraw the device from the cap if necessary.

In Fig. 5 the positive connection 13 between the disks is embodied in the spring itself, the ends of which spring are securely fastened to the disks 11 and 12 at 20 by soldering or otherwise. In this case it is preferable that the spring 17 shall be somewhat stronger than in the case of the other modifications.

I do not restrict myself to any particular means for connecting the two disks 11 and 12 to limit their movement away from each other, beyond the fact that they must be connected in such manner that they have a normal extent of separation, but I prefer to make this connection by links which make a positive limitation, so that the spring 17 between the disks may be put under any degree of static compression to make it more responsive at the inception of the compression of the grease, so that it becomes a material factor associated with the compressed air as a feeding means for the grease.

The mechanism 10 is preferably made reversible so that the two disks 11 and 12 are exactly the same and the device may be inverted in the cap without any interference with its proper functions. It will be manifest, however, that if the device 10 is not to have capacity for reversal, then these disks need not be both alike, but the lower disk 12 which comes in contact with the grease should be solid and have no material apertures in it through which the grease could work its way upward, or through which air might work its way downward through the grease. Any irregularity in the surface of the grease in the cup $a$ when assembling the parts will readily be smoothed and adjusted to proper condition to seal the space between the rim of the disk 12 and the interior of the cap. Moreover, in the use of the device, should there be a failure of adjustment on the part of the operator when the same should be made, the warming of the bearing will cause the grease at the lower part of the cup to soften and there will be the combined action of the spring ends 18 together with the weight of the freely movable structure 10 to assist in causing a feeding of the grease from the cup to prevent an abnormal heating of the bearing. Even after the spring action of the ends 18 ceases the weight of the device 10 is still effective in applying pressure to the grease even to the last portion which is being expelled.

Particular importance is made of the fact that the structure 13 as a whole may be readily removed from the cap for thorough cleansing from time to time, and for permitting the cap itself to be cleaned out, because it is well known that grease, especially of some characters, has a tendency to cake or harden upon the interior of the cups, and this would manifestly interfere with the proper and free operation of the device. Furthermore it is pointed out that the disk structures and their connections as a whole are guided by the side walls of the cap and have no permanent connections with the cap, and moreover are rotatable with respect to the cap; and furthermore may remain stationary upon the grease while the cap itself is rotated during the adjustment. The great flexibility and the freedom of the adjustment of the two disks, one relatively to the other, enables them to adapt themselves to the interior of the cap without possibility of binding or in any wise interfering with the free normal operation of the device. Furthermore, the assemblage of the parts is quickly and easily made and the device as a whole is inexpensive and durable.

While I have shown the construction of grease cup in the form which I prefer in practice, I do not restrict myself to the minor details as these may be modified in various ways without departing from the spirit of the invention.

Having now described my invention, what I claim as new and desire to protect by Letters Patent is:

1. In a grease cup, the combination of the body and a cap screwed into the open end of the body for adjustment, with means within the cap for applying pressure upon the grease, said means consisting of two disks, connecting means to limit their movement from each other, and a spring arranged between the disks for yieldingly forcing them apart within the limits of the connecting means, the said disks having relative yielding capacity for adjustment and guided by the walls of the cap.

2. In a grease cup, the combination of the body and a cap screwed into the open end of the body for adjustment, with means within the cap for applying pressure upon the grease and freely removable from the cap, said means consisting of two disks, link connections between the disks to limit their movement apart, and a spring surrounding the link connection and having its ends pressing upon the respective disks to normally press them apart to the limit permitted by the link connections, the said disks adjustably guided within the cap.

3. In a grease cup, the combination of the body and a cap screwed into the open end of the body for adjustment, with means within the cap for applying pressure upon the grease, said means consisting of two disks yieldingly connected so as to be normally separated at a distance apart but capable of being pressed relatively toward each other, the said means being freely guided within the cap and rotatable therein, and the inner of said disks adapted to make a frictional contact with the inner end of the cap.

4. In a grease cup, the combination of the body and a cap screwed into the open end of the body for adjustment, with means within the cap for applying pressure upon the grease, said means consisting of two disks yieldingly connected so as to be normally separated at a distance apart but capable of being pressed relatively toward each other, the said means being freely guided within the cap and rotatable therein, the inner of said disks adapted to make a frictional contact with the inner end of the cap, and spring devices within the cap for pressing the inner disk out of contact with the inner end of the cap whenever the pressure on the grease is sufficiently removed.

5. In a grease cup, the combination of the body and a cap screwed into the open end of the body for adjustment, with means within the cap for applying pressure upon the grease, said means consisting of two disks yieldingly connected so as to have relative movement toward each other and loosely fitting within the cap and removable therefrom, and with capacity for reversal therein.

6. In a grease cup, the combination of the body and a cap screwed within the open end of the body for adjustment, with means wholly within the cap for applying pressure upon the grease, said means consisting of two disks yieldingly connected so as to have relative movement toward each other and loosely and rotatably fitting within the cap and removable as a unitary structure therefrom, one of said disks adapted to make frictional contact with the inner end of the cap when the cup is adjusted to apply pressure upon the grease, said disks freely rotatable in the cap except when pressure is applied upon the grease.

7. In a grease cup, the combination of the body and a cap screwed into the open end of the body for adjustment, with means within the cap for applying pressure upon the grease, said means consisting of two disks yieldingly connected so as to have relative movement toward each other and loosely fitting within the cap and removable therefrom, one of said disks adapted to make frictional contact with the inner end of the cap when the cup is adjusted to apply pressure upon the grease, and spring devices for holding the disk out of frictional contact with the interior end of the cap except when sufficient pressure is applied by the compression of the grease.

8. In a grease cup, the combination of the body and a cap screwed within the open end of the body for adjustment and to provide air compression within the cap, with means wholly within the cap for applying pressure upon the grease and freely removable therefrom as a unit, said means consisting of a member arranged within the inner end of the cap and normally free to rotate therein, a disk member guided in the open end of the cap by the side walls thereof and also free to rotate therein, a link connection to limit the extent to which the members may be forced apart, and a spring arranged between the members for producing a relative movement of the members apart within the limits of the link connection.

9. In a grease cup, the combination of the body and a cap screwed into the open end of the body for adjustment, with means within the cap for applying pressure upon the grease, said means consisting of a member arranged within the inner end of the cap, a disk member guided in the open end of the cap by the side walls thereof, a link connection to limit the extent to which the members may be forced apart, and a spring arranged between the members for producing a relative movement of the members apart within the limits of the link connection, the said cap having a shoulder portion against which the first mentioned member may be frictionally pressed into contact, said means being freely removable from the cap.

10. In an automatic grease cup, the combination of a body and an air tight cap screwed within the interior of the body so as to make an air tight joint and allow air compression within the cap, with a freely removable means wholly within and guided by the cap for providing air compression within the cap and pressure upon the grease said means consisting of a thin disk freely movable in the open end of the cap, and spring pressure applying devices arranged between the disk and the inner end of the cap but having no fixed connection therewith, said disk adapted to press upon the grease by the compressed air assisted by the spring pressure, and said devices yieldably holding the disk normally in a transverse position to the axis of the cap.

In testimony of which invention, I hereunto set my hand.

EDWARD F. BURROW.

Witnesses:
R. M. HUNTER,
FLORENCE DEACON.

Copies of this patent may be obtained for five cents each, by addressing the "Commissioner of Patents. Washington, D. C."